(12) United States Patent
Ushioda et al.

(10) Patent No.: US 7,930,166 B2
(45) Date of Patent: Apr. 19, 2011

(54) TRANSLATION SUPPORT DEVICE

(75) Inventors: Akira Ushioda, Kawasaki (JP); Masaru Fuji, Kawasaki (JP); Seiji Okura, Kawasaki (JP); Tatsuo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1559 days.

(21) Appl. No.: 11/068,955

(22) Filed: Mar. 2, 2005

(65) Prior Publication Data
US 2005/0149316 A1  Jul. 7, 2005

Related U.S. Application Data

(63) Continuation of application No. PCT/JP03/03105, filed on Mar. 14, 2003.

(51) Int. Cl.
*G06F 17/28* (2006.01)

(52) U.S. Cl. ......... 704/2; 704/3; 704/5; 704/8; 715/254; 715/264

(58) Field of Classification Search .................. 704/2–8; 715/254, 264

See application file for complete search history.

(56) References Cited

U.S. PATENT DOCUMENTS

| | | | | |
|---|---|---|---|---|
| 5,297,027 A | * | 3/1994 | Morimoto et al. | 715/254 |
| 5,384,703 A | * | 1/1995 | Withgott et al. | 715/236 |
| 5,526,259 A | * | 6/1996 | Kaji | 704/3 |
| 6,360,196 B1 | * | 3/2002 | Poznanski et al. | 704/8 |
| 6,463,404 B1 | * | 10/2002 | Appleby | 704/9 |
| 6,862,566 B2 | * | 3/2005 | Wakita et al. | 704/2 |
| 6,920,419 B2 | * | 7/2005 | Kitamura et al. | 704/2 |
| 7,010,479 B2 | * | 3/2006 | Murata et al. | 704/9 |
| 7,124,074 B2 | * | 10/2006 | Weise et al. | 704/9 |
| 7,194,403 B2 | * | 3/2007 | Okura et al. | 704/7 |
| 7,346,488 B2 | * | 3/2008 | Kodama | 704/4 |
| 2002/0138250 A1 | * | 9/2002 | Okura et al. | 704/2 |

FOREIGN PATENT DOCUMENTS

| | | |
|---|---|---|
| JP | 7-13970 | 1/1995 |
| JP | 2001-84249 | 3/2001 |
| JP | 2002-278964 | 9/2002 |
| WO | 99/57651 | 11/1999 |

OTHER PUBLICATIONS

S. Sato, "CTM: An Example-Based Translation Aid System", ACTES DE COLING-92, NANTES, Aug. 23-28, 1992, pp. 1259-1263.
Chandrasekar, Doran and Srinivas, "Motivation and Methods for Text Simplification", Proc. of Coling, Aug. 6 ,1995, pp. 1041-1044.
Yoon-Hyun Roh et al., "Long Sentence Partitioning using Structure Anaylysis for Machine Translation" Proceedings of the Sixth Natural Language Processing Pacific Rim Symposium, Nov. 27-30, 2001.
European Search Report dated Apr. 4, 2010 and issued in corresponding European Patent Application 03710365.2.
Nagao M : "A Framework of a Mechanical Translasion Between Japanese and English by Analogy Principle", Artificial and Human Intelligence, Jan. 1, 1984, pp. 173-181.
European Office Action dated Aug. 4, 2010 in corresponding European Patent Application 03 710 365.2.

* cited by examiner

*Primary Examiner* — David R Hudspeth
*Assistant Examiner* — Lamont M Spooner
(74) *Attorney, Agent, or Firm* — Staas & Halsey LLP

(57) ABSTRACT

A translation support device for supporting a process of translating an original sentence in a language into another language, comprising a partial expression setting unit, a dummy head setting unit, an original sentence replacement unit, a translated sentence obtaining unit, and a translated sentence replacement unit.

17 Claims, 14 Drawing Sheets

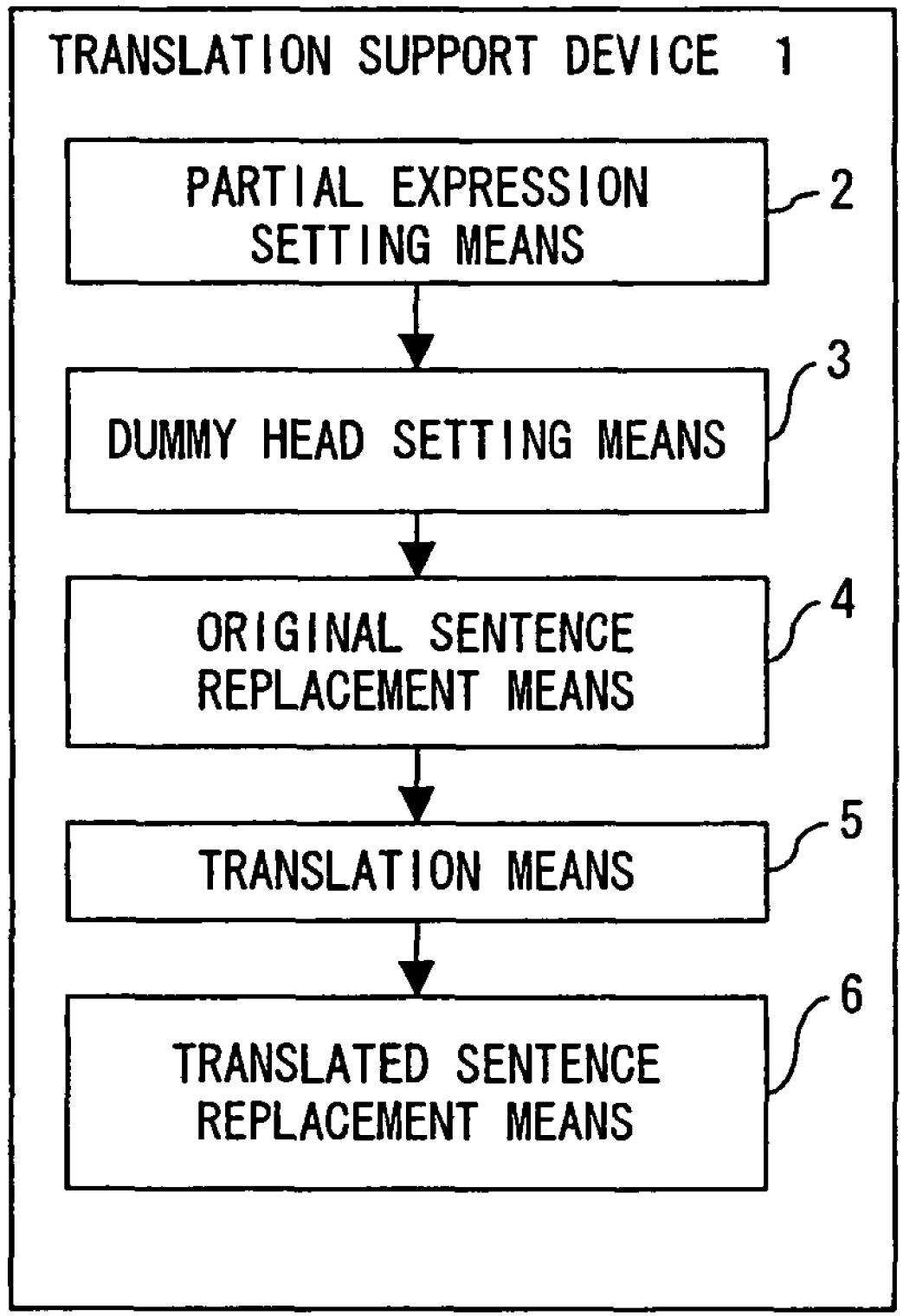
F I G. 1

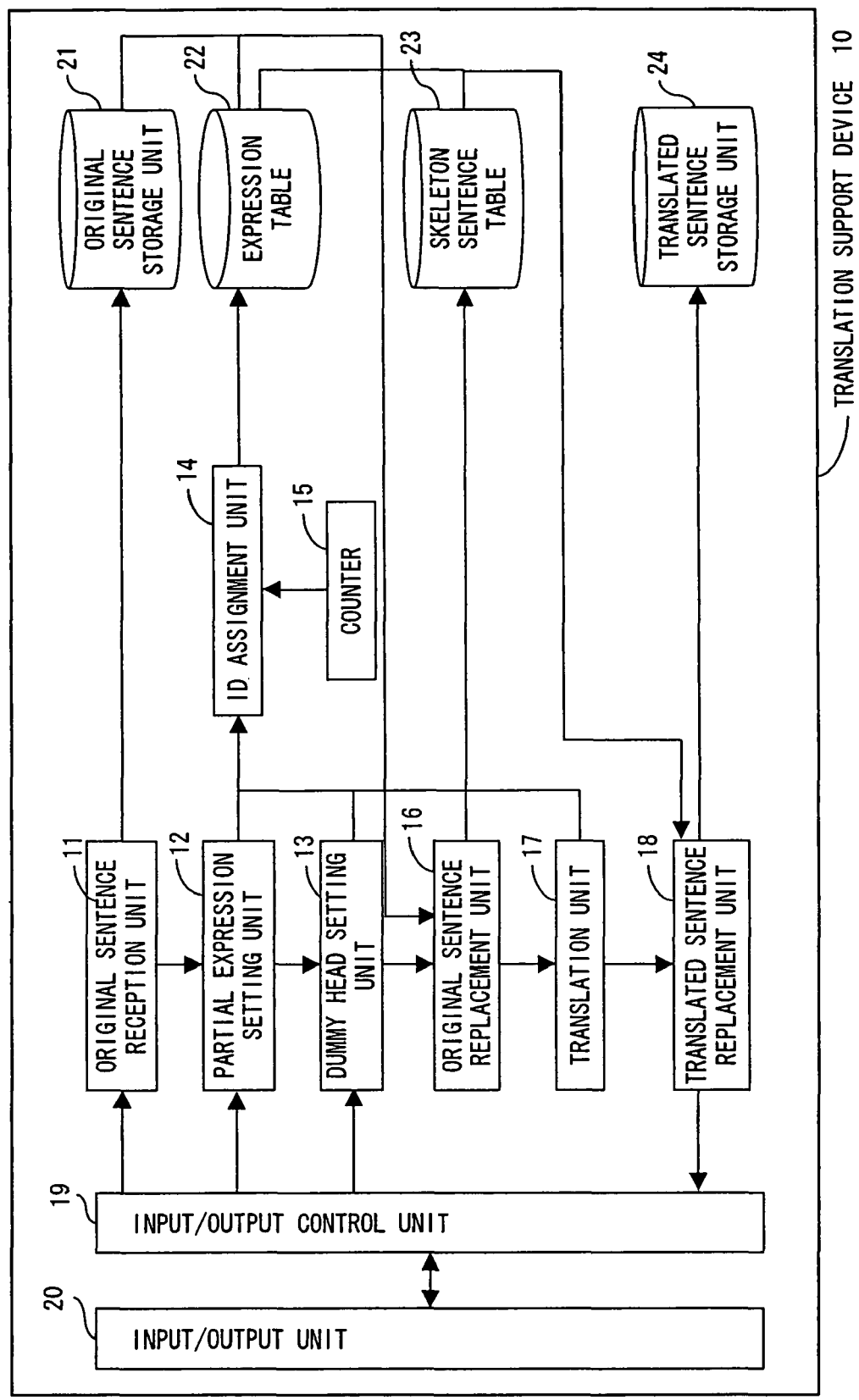
F I G. 2

| COUNT VALUE | GBH ORIGINAL SENTENCE PARTIAL EXPRESSION | GDH ORIGINAL SENTENCE DUMMY HEAD | YBH TRANSLATED PARTIAL EXPRESSION | YDH ORIGINAL SENTENCE DUMMY HEAD |
|---|---|---|---|---|
| | GBH-1 | GDH-1 | YBH-1 | YDH-1 |
| 1 | 本発明により提供された統合型光送信装置 | 本装置 | An integrated optical transmitter…invention | This device |
| | GBH-2 | GDH-2 | YBH-2 | YDH-2 |
| 2 | 光ビームを生成する……光変調器 | 光変調器 | an optical head assembly……signals | an optical modaulator |
| ⋮ | ⋮ | ⋮ | ⋮ | ⋮ |

NOTE: THE ABOVE JAPANESE SENTENCES AND PHRASES INDICATE JAPANESE BEFORE TRANSLATION.

FIG. 3

| COUNT VALUE | ORIGINAL SKELETON SENTENCE | TRANSLATED SKELETON SENTENCE |
|---|---|---|
| 0 | 本装置は、光変調器によって特徴付けられる。 | this device is characterized by an optical modulator |
| 2 | 光ヘッド・アセンブリ、及び光変調器 | an opitical head assembly and an optical modulator |
| ⋮ | ⋮ | ⋮ |

NOTE: THE ABOVE JAPANESE SENTENCES INDICATE JAPANESE BEFORE TRANSLATION.

F I G. 4

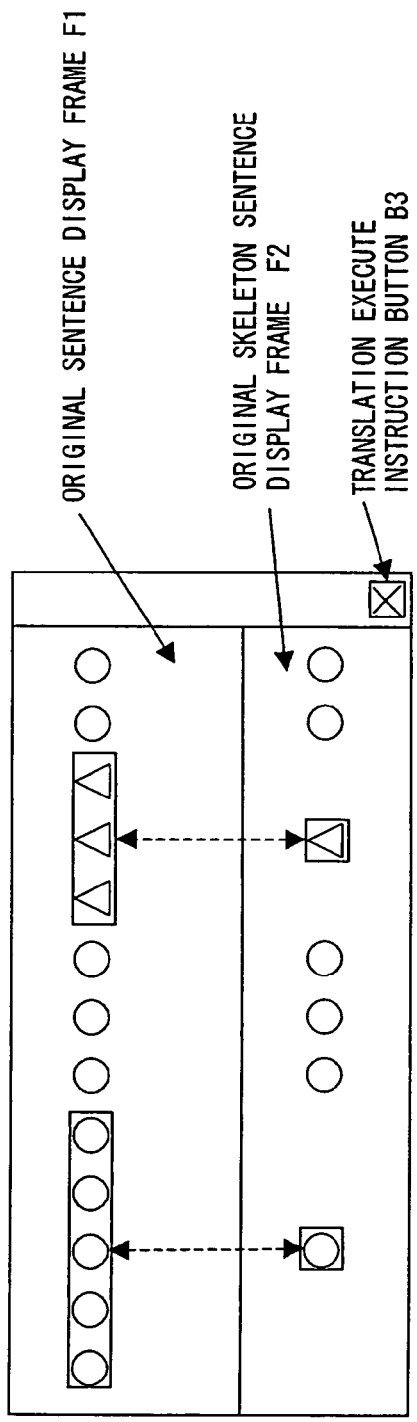
F I G. 8

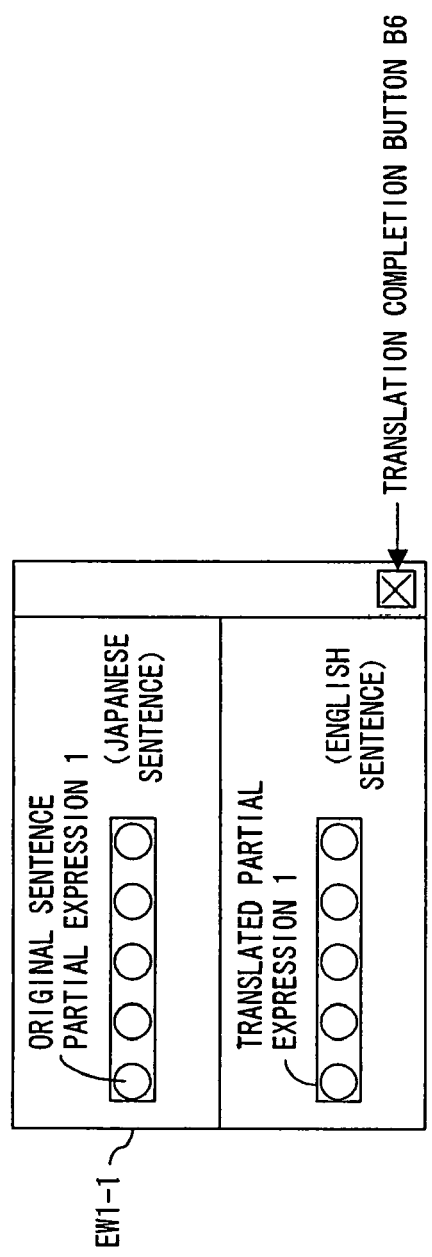
F I G. 1 1

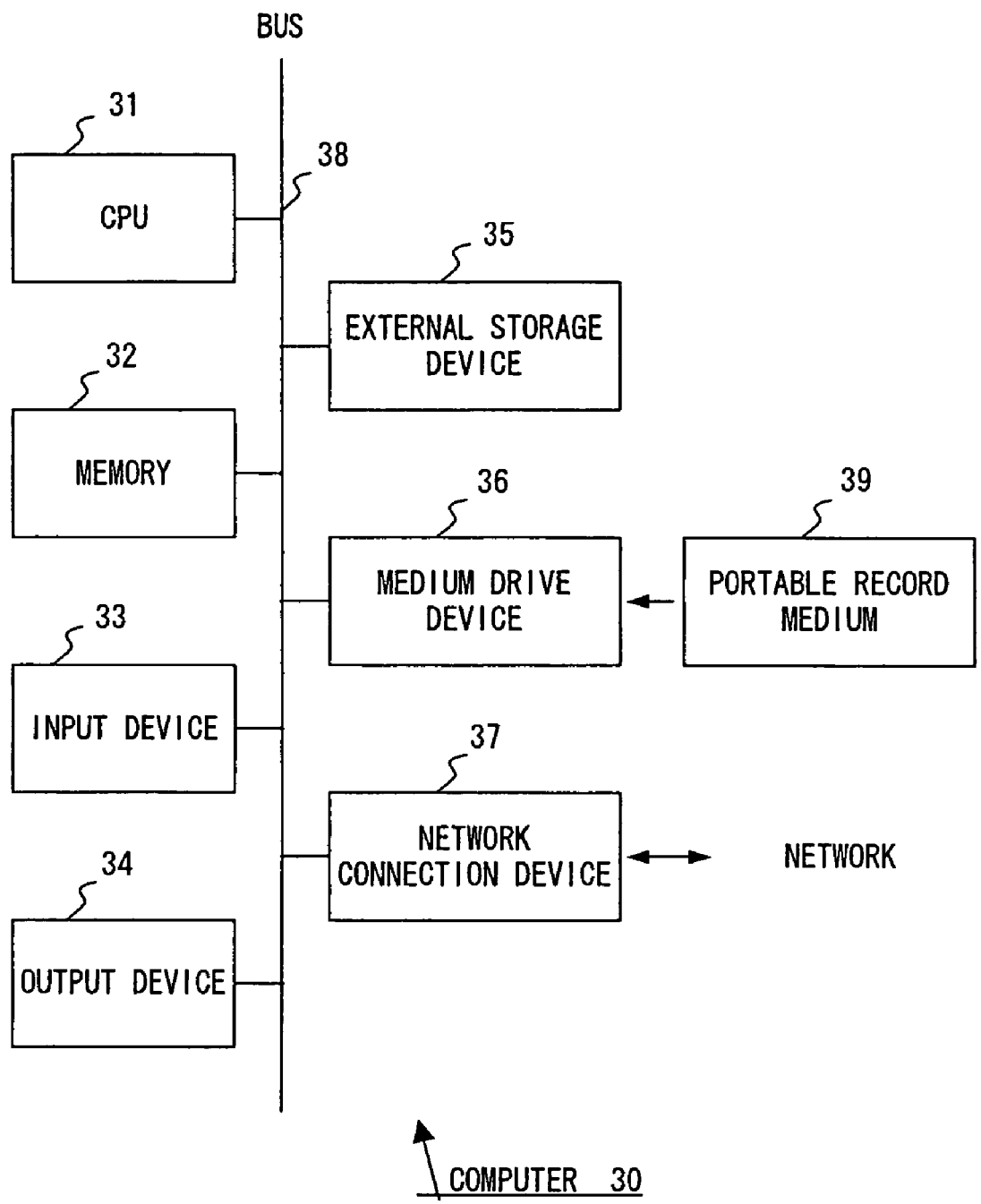
F I G. 13

TRANSLATION SUPPORT DEVICE

CROSS REFERENCE TO RELATED APPLICATION

This application is a continuation of international PCT application No. PCT/JP03/03105 filed on Mar. 14, 2003.

BACKGROUND OF THE INVENTION

1. Field of the Invention

The present invention relates to a technology of supporting translation of a sentence from a language into another language, and more specifically to the support of translation of a sentence whose structure is relatively complicated.

2. Description of the Related Art

Conventionally, an online dictionary device, a machine translation device, a translation memory device for retrieving an appropriate translation-with-original from a translation-with-original database storing translations-with-originals, etc. have been used to support an operation of translating a sentence.

For example, a translation support device relating to a conventional technology includes a machine translation device, a translation memory device, a translation-with-original database, a data interconversion processing unit, and an interface unit. A user inputs a sentence to be translated (hereinafter referred to as an original sentence) and an instruction about translation control, and receives a translation as output of the translation support device as a reply through the interface unit. The machine translation device translates an original sentence input through the interface unit. The translation memory device obtains a translation-with-original having a portion matching a portion of an original sentence by searching a translation-with-original database using the original sentence as a sentence input for a search. The data interconversion processing unit analyzes a translation obtained by the machine translation device or a sentence translated by a user, associates the translation with the original sentence corresponding to the translation, thereby generating a translation-with-original and writing it to the translation-with-original database. Thus, the machine translation device is associated with the translation memory device, and the efficiency of a translating operation can be improved (patent literature 1).

Patent Literature 1

Japanese Patent Laid-open Publication No. 2002-278964

However, according to the conventional technology, the support can be only realized by obtaining a partial translation in an original sentence by obtaining a translation-with-original having a portion matching a portion of the original sentence. Therefore, a user cannot obtain the translation of the entire original sentence. That is, the user has the problem that it is necessary to generate the translation of the entire original sentence by editing the partial translations while considering the sentence structure of the original sentence and combining the partial translations. The more complicated the sentence structure is, the more difficult the editing operation becomes.

SUMMARY OF THE INVENTION

The present invention aims at solving the above-mentioned problems, and allowing a user to easily obtain the translation of the entire original sentence.

To attain the above-mentioned objective, a translation support device for supporting the process of translating an original sentence in a language into another language according to an aspect of the present invention includes: a partial expression setting unit for setting a character string contained in an original sentence as a first original sentence partial expression; a dummy head setting unit for setting a character string representing the first original sentence partial expression as a first original sentence dummy head; an original sentence replacement unit for generating a first original skeleton sentence by replacing the first original sentence partial expression in the original sentence with the first original sentence dummy head; a translated sentence obtaining unit for obtaining a first translated skeleton sentence which is a translation of the first original skeleton sentence and a first translated partial expression which is a translation of the first original sentence partial expression; and a translated sentence replacement unit for generating a translation of the original sentence by replacing a first translation dummy head which is a translation of the first original sentence dummy head in the first translated skeleton sentence with the first translated partial expression.

With the above-mentioned configuration, an original sentence replacement unit generates an original skeleton sentence by degenerating an original sentence by replacing a partial expression configuring the original sentence with a dummy head. The translated sentence obtaining unit obtains a translated skeleton sentence which is a translation of an original skeleton sentence and a translated partial expression which is a translation of an original sentence partial expression. Then, the translated sentence replacement unit obtains a translation of the entire original sentence, which is to be degenerated, by replacing a translated dummy head in the translated skeleton sentence. Thus, the user can easily generate a translation of the entire original sentence. It is desired that the dummy head semantically or syntactically represents the first original sentence partial expression, and is a shorter character string than the first original sentence partial expression. Thus, although an original skeleton sentence is translated by machine translation, it can be translated with high accuracy.

The translation support device can further includes an output control unit for controlling an output device such that the original sentence partial expression can be output to a window other than a window in which the original sentence is displayed. Thus, a user interface can be improved.

In the above-mentioned translation support device, an original sentence partial expression can be further set in the original sentence partial expression so that a translating and replacing process can be recursively performed. In this case, the partial expression setting unit first sets a character string contained in the first original sentence partial expression as a second original sentence partial expression. The dummy head setting unit further sets a character string representing the second original sentence partial expression as a second original sentence dummy head. Then, the original sentence replacement unit further replaces the second original sentence partial expression in the first original sentence partial expression with the second original sentence dummy head, thereby generating a second original skeleton sentence. The translated sentence obtaining unit further obtains a second translated skeleton sentence which is a translation of the second original skeleton sentence, and a second translated partial expression which is a translation of the second original sentence partial expression. The translated sentence replacement unit further generates a first translated partial expression which is a translation of the first original sentence partial expression by replacing a second translated sentence dummy head which is a translation of the second original sentence dummy head in the second translated skeleton sentence with the second translated partial expression. Thus generated first translated partial expression is further replaced with the first translated sentence dummy head in the first translated skeleton sentence, thereby finally generating a translation of the entire original sentence.

For example, the sentence structure of the first original sentence partial expression can be relatively complicated. In this case, a second original sentence partial expression and a second original sentence dummy head can be set in the first original sentence partial expression, and the second original sentence partial expression is replaced with the second original sentence dummy head, thereby degenerating the first original sentence partial expression. Then, the second original sentence partial expression and a degenerated first original sentence partial expression are translated. Finally, a translation of the second original sentence dummy head in the translation of the degenerated first original sentence partial expression is replaced with a translation of the second original sentence partial expression, thereby obtaining a translation of the first original sentence partial expression, that is, the first translated partial expression. As described above, a first translated sentence dummy head in a first translated skeleton sentence is replaced with the first translated partial expression. Therefore, the translation support device can generate a translation of the entire original sentence through the above-mentioned recursive translating and replacing process.

The translation support device can further include an ID assignment unit for assigning, an identifier for identification to each of the first original sentence partial expression, the first original sentence dummy head, the first translated partial expression, and the first translated sentence dummy head. In this case, the first original sentence partial expression, the first original sentence dummy head, the first translated partial expression, and the first translated sentence dummy head are associated with one another using the identifier, and the original sentence replacement unit and the translated sentence replacement unit perform the above-mentioned replacement based on the identifier.

Thus, the translation support device manages the correspondence among an original sentence partial expression, an original sentence dummy head, a translated partial expression, and a translated sentence dummy head, thereby appropriately performing replacement between the corresponding dummy head and partial expression. Therefore, the user can be free of managing the dummy head and the partial expression with special attention to the correspondence between them.

The translation support device can further include a counter unit for incrementing a count value each time an original sentence partial expression is specified so that the ID assignment unit can generate the identifier based on the count value of the counter unit. In this case, the corresponding original sentence partial expression, original sentence dummy head, translated partial expression, and translated sentence dummy head have the same count values in the respective identifiers. The method of generating the identifier is only an example.

The above-mentioned translation support device can further includes a translation-with-original generation unit for generating translation-with-original information by associating an original sentence partial expression with a translated partial expression of the original sentence partial expression, a translation-with-original storage unit for accumulating and storing the translation-with-original information, and a retrieval unit for retrieving translation-with-original information having an original sentence partial expression matching at least a part of the third original sentence partial expression from the translation-with-original storage unit. In this case, the retrieved translation-with-original information is used in obtaining the third translated partial expression corresponding to the third original sentence partial expression. Thus, when a user translates an original sentence partial expression, the user can easily obtain a previous translation result useful in the current translating operation.

The above-mentioned translation support device can further include an output control unit for controlling an output device such that a character string translated according to the translation-with-original information can be highlighted and output in the original sentence partial expression and the translated partial expression. Thus, the user can easily identifies a portion translated based on the past translation result in the partial expression.

The translation support device can also include translation unit for performing machine translation. In this case, the output control unit controls the output device to highlight and output the translated character string based on the machine translation in the original sentence partial expression and the translated partial expression. Thus, the user can easily identify the portion of the machine translation in the partial expression.

The above-mentioned translation support device can also share the translation-with-original storage unit with a plurality of translation support devices connected through a network. Thus, a user of the translation support device connected to the same network can use in his or her translating operation a result of the translating operation by another user of another translation support device.

Since a translation supporting method including as a procedure an operation performed by each unit configuring the translation support device can also obtain the same operations and effects of the processes performed by the translation support device with the above-mentioned configuration, the above-mentioned objective can be attained.

Also, since a program used to direct a computer to perform the same control as the procedure in the translation supporting method can obtain the same operation and effect as the process performed by the above-mentioned translation support device by directing a computer to execute the program, the above-mentioned objective can be attained. The above-mentioned objective can also be attained by a computer reading and executing a program from a record medium (recording device) which records the program.

BRIEF DESCRIPTION OF THE DRAWINGS

FIG. 1 shows the principle of the translation support device according to the present invention;

FIG. 2 shows the configuration of the translation support device according to the present invention;

FIG. 3 shows an example of the data structure of an expression table;

FIG. 4 shows an example of the data structure of an expression table;

FIG. 8 shows an example of displaying the first editor window after the completion of setting a partial expression;

FIG. 11 shows an example (2) of displaying the 1-1 editor window after setting a dummy head;

FIG. 13 shows the configuration of a computer; and

DESCRIPTION OF THE PREFERRED EMBODIMENTS

Figure 5:
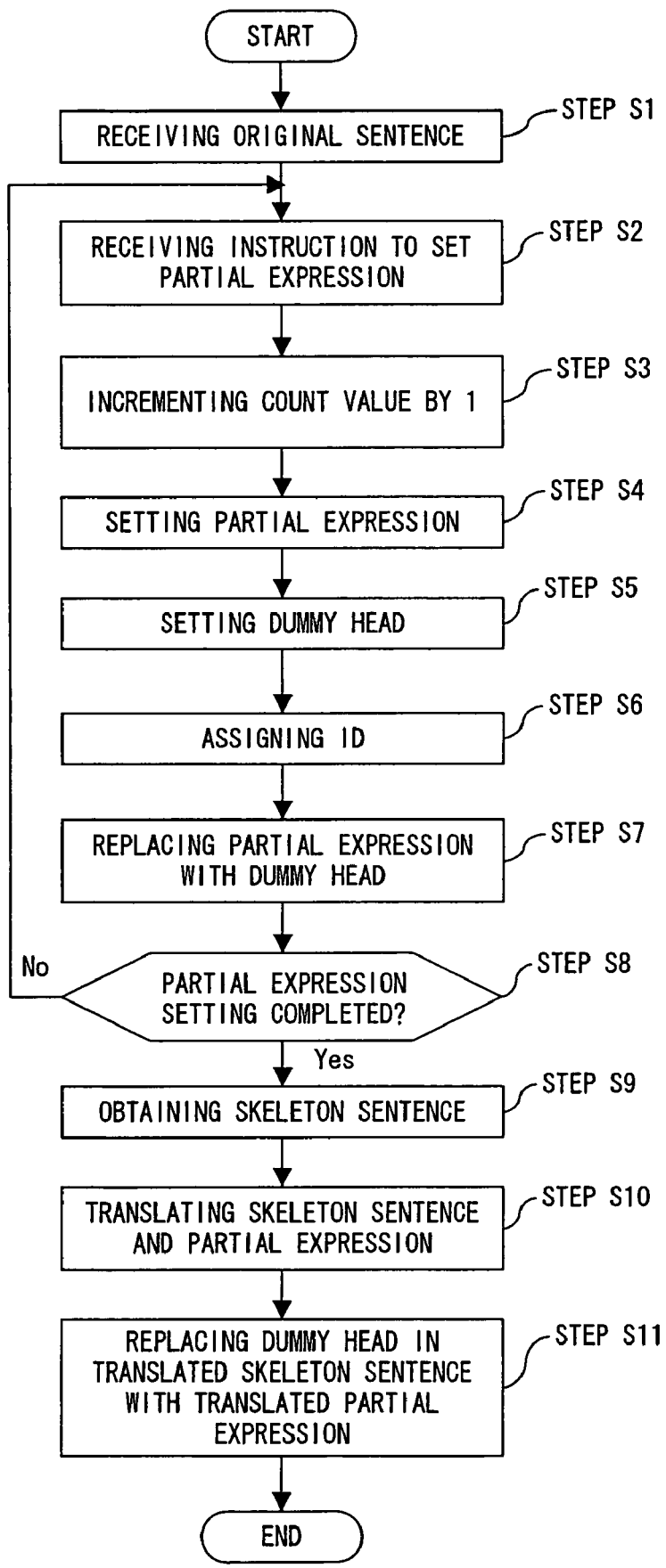
FIG. 5 is a flowchart of the procedure of the translation supporting process.

The embodiments of the present invention are described below by referring to the attached drawings. The same devices, etc. are assigned the same reference numerals, and the explanation is omitted here.

FIG. 1 shows the principle of the translation support device according to the present invention. A translation support device 1 according to the present invention supports the process of translating a sentence from a language into another language. As shown in FIG. 1, the translation support device 1 comprises a partial expression setting unit 2, a dummy head setting unit 3, an original sentence replacement unit 4, a translation unit 5, and a translated sentence replacement unit 6.

The partial expression setting unit 2 sets a character string contained in an original sentence as an original sentence partial expression. It is desired that the original sentence partial expression has a common semantic portion. For example, an example of an original sentence partial expression can be a noun phrase, an adjective phrase, etc. The dummy head setting unit 3 sets a character string (expression) which represents the set original sentence partial expression and is shorter than the original sentence partial expression. Hereinafter, a short expression representing an original sentence partial expression is referred to as an original sentence dummy head. It is desired that the original sentence dummy head semantically or syntactically represents the corresponding original sentence partial expression.

The original sentence replacement unit 4 generates a sentence by shortening the original sentence by replacing the partial expression in the original sentence with a dummy head corresponding to the partial expression. Hereinafter, an original sentence shortened by replacing the original sentence partial expression with an original sentence dummy head is referred to as an original skeleton sentence. The translation unit 5 obtains a translation of an original skeleton sentence and a translation of an original sentence partial expression by translating the original skeleton sentence and the original sentence partial expression. Hereinafter, a translation of an original skeleton sentence and a translation of an original sentence partial expression are referred to as a translated skeleton sentence and a translated partial expression. A translated skeleton sentence contains a translation of an original sentence dummy head. The translation of the original sentence dummy head is referred to as a translated sentence dummy head. The translated sentence replacement unit 6 generates a translation of an original sentence by replacing the translated sentence dummy head in the translated skeleton sentence with a translated partial expression. Instead of translating a sentence by a translation unit, a translated skeleton sentence and a translated partial expression can be obtained based on the input from a user. In this case, the translation unit 5 is changed into the translated sentence obtaining unit.

Thus, using the translation support device according to the present invention, the original sentence replacement unit 4 degenerates an original sentence by replacing a partial expression configuring the original sentence with a dummy head. A translation of the degenerated original sentence and a translation of a partial expression are obtained. Then, the translated sentence replacement unit 6 obtains a translated dummy head from the translation of the degenerated original sentence, and the translated dummy head contained in the translation of the degenerated original sentence is replaced with a translated partial expression, thereby obtaining a translation of the entire original sentence before it is degenerated. Thus, according to the translation support device, a translation of the entire original sentence can be easily generated.

The configuration of the translation support device is described below by referring to FIG. 2. As shown in FIG. 2, a translation support device 10 comprises an original sentence reception unit 11, a partial expression setting unit 12, a dummy head setting unit 13, an ID assignment unit 14, a counter 15, an original sentence replacement unit 16, a translation unit 17, a translated sentence replacement unit 18, an input/output control unit 19, an input/output unit 20, an original sentence storage unit 21, an expression table 22, a skeleton sentence table 23, and a translated sentence storage unit 24.

The original sentence reception unit 11 receives an original sentence through the input/output control unit 19 and the input/output unit 20, and writes the original sentence to the original sentence storage unit 21. The partial expression setting unit 12 sets a character string of an original sentence as an original sentence partial expression, and writes the original sentence partial expression to the expression table 22. The character string to be set as an original sentence partial expression can be automatically specified, or specified by the indication of a user. In the conventional sentence structure analyzing technology, it is sometimes difficult to specify an original sentence partial expression having a common semantic portion with high accuracy. In this case, it is more desired to specify an original sentence partial expression based on the specification of the user than to adopt automatic specification.

The dummy head setting unit 13 sets an original sentence dummy head corresponding to each of the set original sentence partial expressions, and writes a setting result to the expression table 22. The specification of an expression to be set as an original sentence dummy head can also be automatically performed or based on the specification of a user.

The ID (identifier) assignment unit 14 assigns an identifier (hereinafter referred to as an ID) for identification to each of the original sentence partial expression, the original sentence dummy head, the translated partial expression, and the translated sentence dummy head based on the count value of the counter 15, and writes the assigned identifier to the expression table 22. An ID assigned to a partial expression is hereinafter referred to as a partial expression ID, and an ID assigned to a dummy head as a dummy head ID. The count value of the counter 15 is incremented by 1 each time an original sentence partial expression is set.

The original sentence replacement unit 16 replaces the original sentence partial expression in an original sentence with a corresponding original sentence dummy head. When a plurality of original sentence partial expressions are set in an original sentence, each of the plurality of original sentence partial expressions is replaced with an original sentence dummy head. Thus, the original sentence replacement unit 16 generates an original skeleton sentence. The original skeleton sentence is written to the skeleton sentence table 23.

The translation unit 17 comprises a dictionary database not shown in the attached drawings, and has the function of performing machine translation. The translation unit 17 generates a translated skeleton sentence by translating an original skeleton sentence, and translates an original sentence partial expression, thereby generating a translated partial expression. The generated translated skeleton sentence and translated partial expression are respectively written to the skeleton sentence table 23 and the expression table 22. Since an original skeleton sentence includes an original sentence dummy head, the translated skeleton sentence naturally contains a translated original sentence dummy head (translated sentence dummy head). The translation unit 17 writes the translated sentence dummy head to the expression table 22. The user can be allowed to edit a translation result by the translation unit 17.

The translated sentence replacement unit 18 generates a translation of the entire original sentence by replacing the translated sentence dummy head in the translated skeleton sentence with a translated partial expression. The generated translation is written to the translated sentence storage unit 24. The input/output control unit 19 controls the information output to the input/output unit 20 and the information input from the user through the input/output unit 20. The input/output unit 20 is used in inputting an instruction and information from a user, issuing an inquiry from the translation support device 10 to the user, outputting a process result, etc.

The original sentence storage unit 21 stores an ID of an original sentence (the name of an original sentence is acceptable) together with the original sentence. The expression table 22 stores an original sentence partial expression, an original sentence dummy head, a translated partial expression, and a translated sentence dummy head together with their IDs with the corresponding count value used when the partial expression is set. FIG. 3 shows an example of the data structure of the expression table 22.

In FIG. 3, the IDs of the original sentence partial expression, the original sentence dummy head corresponding to the original sentence partial expression, the translated partial expression, and the translated sentence dummy head set when the count value of the counter 15 is 1 are respectively "GBH-1", "GDH-1", "YBH-1", and "YDH-1".

The skeleton sentence table 23 stores an original skeleton sentence and a translated skeleton sentence corresponding to the count value. For a received original skeleton sentence, the count value is 0 (zero), but when a set partial expression has a complicated sentence structure as described later, the phrase in the partial expression can be selected as a further partial expression. In this case, the count value is a value obtained when the previous partial expression is set. The translated sentence storage unit 24 stores the translation of the original sentence together with the ID (the name of an original sentence is acceptable) of the original sentence. FIG. 4 shows an example of a data structure of the skeleton sentence table 23.

Before explaining the operation of the translation support device below, the translating method adopted in the translation support device according to the present invention is first described. The translating method is based on "divide and conquer".

For easy explanation, assume that the following Japanese original sentence 0 is translated into English.

original sentence 0: "本発明により提供された統合型光送信装置は、光ビームを生成する光ヘッド・アセンブリ、及び光ビームを受光しそれに対し変調信号に応じ変調を与える光変調器によって特徴付けられる。 (this sentence means: The integral optical transmission device provided by the present invention is characterized by an optical head assembly for generating an optical beam, and an optical modulator for receiving an optical beam and modulating the beam according to a modulation signal)".

The following specification and settings in the assumption and the translating method are samples only. In the explanation, the language applicable in the translating method, or the structure of an original sentence is not limited.

In the present translating method, the original sentence partial expression is set in the original sentence. For example, the following two original sentence partial expressions can be set from the above-mentioned original sentence 0.

original sentence partial expression 1: "本発明により提供された統合型光送信装置 (this sentence means: an integral optical transmission device provided by the present invention)"

original sentence partial expression 2: "光ビームを生成する光ヘッド・アセンブリ、及び光ビームを受光しそれに対し変調信号に応じ変調を与える光変調器 (this sentence means: an optical head assembly for generating an optical beam, and an optical modulator for receiving an optical beam and modulating the beam according to a modulation signal)"

Then, a short expression semantically representing the original sentence partial expression is set for each original sentence partial expression. Hereinafter, the "the short explanation representing the original sentence partial expression" is hereinafter referred to as an original sentence dummy head. For example, when the original sentence is 0, the original sentence dummy head 1 for the original sentence partial expression 1, and the original sentence dummy head 2 for the original sentence partial expression 2 are set as follows.

original sentence dummy head 1: "本装置 (this means: this device)"

original sentence dummy head 2: "光変換器∞(this means: optical converter)"

The original skeleton sentence is generated by replacing the original sentence partial expression with the corresponding original sentence dummy head. For example, the following original skeleton sentence can be obtained for the above-mentioned original sentence 0.

original skeleton sentence 0:"本装置は、光変調器によって特徴付けられる。(this sentence means: This device is characterized by an optical modulator.)"

The translated skeleton sentence is obtained by translating the original skeleton sentence. For example, in the case of the above-mentioned original skeleton sentence 0, the following translated skeleton sentence 0 can be obtained.

translated skeleton sentence 0: "This device is characterized by an optical modulator."

"This device" in the translated skeleton sentence 0 corresponds to the translated sentence dummy head 1 of the original sentence dummy head 1, and "an optical modulator" corresponds to the translated sentence dummy head 2 of the original sentence dummy head 2.

The translated partial expression is obtained by translating each original sentence partial expression. The original sentence partial expression 1 has a relatively simple sentence structure, and translated as follows.

translated partial expression 1: "An integrated optical transmitter provided in accordance with the present invention"

The original sentence partial expression 2 has a relatively complicated sentence structure, it can be translated after degenerating it into a short phrase. For example, the following two original sentence partial expressions can be further specified from the above-mentioned original sentence partial expression 2.

original sentence partial expression 2-1: "光ビーム を生成する 光ヘッド・アセンブリ (this means: optical head assembly for generating an optical beam)"

original sentence partial expression 2-2: "光ビーム を受光しそれに対し変調信号に応じ変調を与える光変調器 (this means: optical modulator for receiving optical beam and modulating the beam according to a modulation signal)"

Then, as described above, an original sentence dummy head is set for the original sentence partial expressions 2-1 and 2-2, the original skeleton sentence (it may be appropriate to describe a skeleton expression, but the term "skeleton sentence" is used to unify the terminology) of the original sentence partial expression 2 is generated, and the original skeleton sentence is translated, thereby generating a translated skeleton sentence. The original sentence dummy head, the original skeleton sentence, and the translated skeleton sentence are, for example, represented by the followings.

original sentence dummy head 2-1: "光ヘッド・アセンブリ (this means: optical head assembly)"

original sentence dummy head 2-2: "光変調器 (this means: optical modulator)"

original skeleton sentence 2: "光ヘッド・アセンブリ、及び光変調器 (this means: optical head assembly and optical modulator)"

translated skeleton sentence 2: "光ヘッド・アセンブリ、及び光変調器 (this means: an optical head assembly and an optical modulator)"

The "optical device" in the translated skeleton sentence 2 corresponds to the translated sentence dummy head 2-1 of the original sentence dummy head 2-1, and "an optical modulator" corresponds to the translated sentence dummy head 2-2 of the original sentence dummy head 2-2.

Then, the following translated partial expressions 2-1 and 2-2 are obtained by performing the translation on the original sentence partial expressions 2-1 and 2-2.

translated partial expression 2-1: "an optical head assembly for generating an optical beam"

translated partial expression 2-2: "an optical modulator which receives the optical beam and provides modulation thereto in response to modulation signals"

Then, the translated sentence dummy heads 2-1 and 2-2 in the translated skeleton sentence 2 are respectively replaced with the translated partial expressions 2-1 and 2-2 to obtain a translation of the original sentence partial expression 2, that is, the translated partial expression 2.

translated partial expression 2: "an optical head assembly for generating an optical beam and an optical modulator which receives the optical beam and provides modulation thereto in response to modulation signals"

Finally, the translated sentence dummy heads 1 and 2 of the translated skeleton sentence 0 are respectively replaced with the translated partial expressions 1 and 2 to obtain a translation 0 of the original sentence 0.

translation 0: "An integrated optical transmitter provided in accordance with the present invention is characterized by an optical head assembly for generating an optical beam and an optical modulator which receives the optical beam and provides modulation thereto in response to modulation signals."

Next, the operation of the translation support device for realizing the above-mentioned translating method is explained by referring to FIGS. 5 through 11. In the following explanation, it is assumed that the translation support device 10 adopts the GUI (graphic user interface), but the interface adopted in the translation support device 10 is not limited. Although a partial expression and a dummy head is specified based on the input of a user in the explanation, but the specification can also be automatically performed by a sentence structure analysis algorithm. For easy explanation, the operation is explained by referring to the same original sentence as in the above-mentioned explanation.

First, the original sentence reception unit 11 accepts an original sentence from the input/output unit 20 through the input/output control unit 19, and writes the received original sentence to the original sentence storage unit 21 (step S1). Then, the partial expression setting unit 12 receives a set instruction of an original sentence partial expression from the input/output unit 20 (step S2). When a set instruction of the original sentence partial expression is received, the counter 15 increments the count value by 1. The initial value of the counter 15 is, for example, 0 (zero) (step S3).

The partial expression setting unit 12 obtains a character string in a original sentence selected as an original sentence partial expression by a user, and writes the character string in the area storing an original sentence partial expression in the expression table 22 (step S4). When a set instruction of the original sentence dummy head is received from the input/output unit 20, the dummy head setting unit 13 obtains the character string input by the user as an original sentence dummy head, and writes the character string to the area for storing an original sentence dummy head in the expression table 22 (step S5).

Then, the ID assignment unit 14 generates an ID to be assigned to a set original sentence partial expression and original sentence dummy head based on the count value, and writes the generated ID to the area storing the ID in the expression table 22 (step S6). For example, in the expression table 22 shown in FIG. 3, the ID assigned to the original sentence partial expression is "GBH-(count value)", and the ID assigned to the original sentence dummy head is "GDH-(count value)".

Next, the original sentence partial expression in the original sentence is replaced with the original sentence dummy head corresponding to the original sentence partial expression (step S7). The original sentence dummy head corresponding to the original sentence partial expression can be judged based on the ID stored in the expression table 22. In the case of the expression table 22 shown in FIG. 3, the original sentence partial expression and the original sentence dummy head having the same count values in the IDs are associated with each other.

Figure 6:
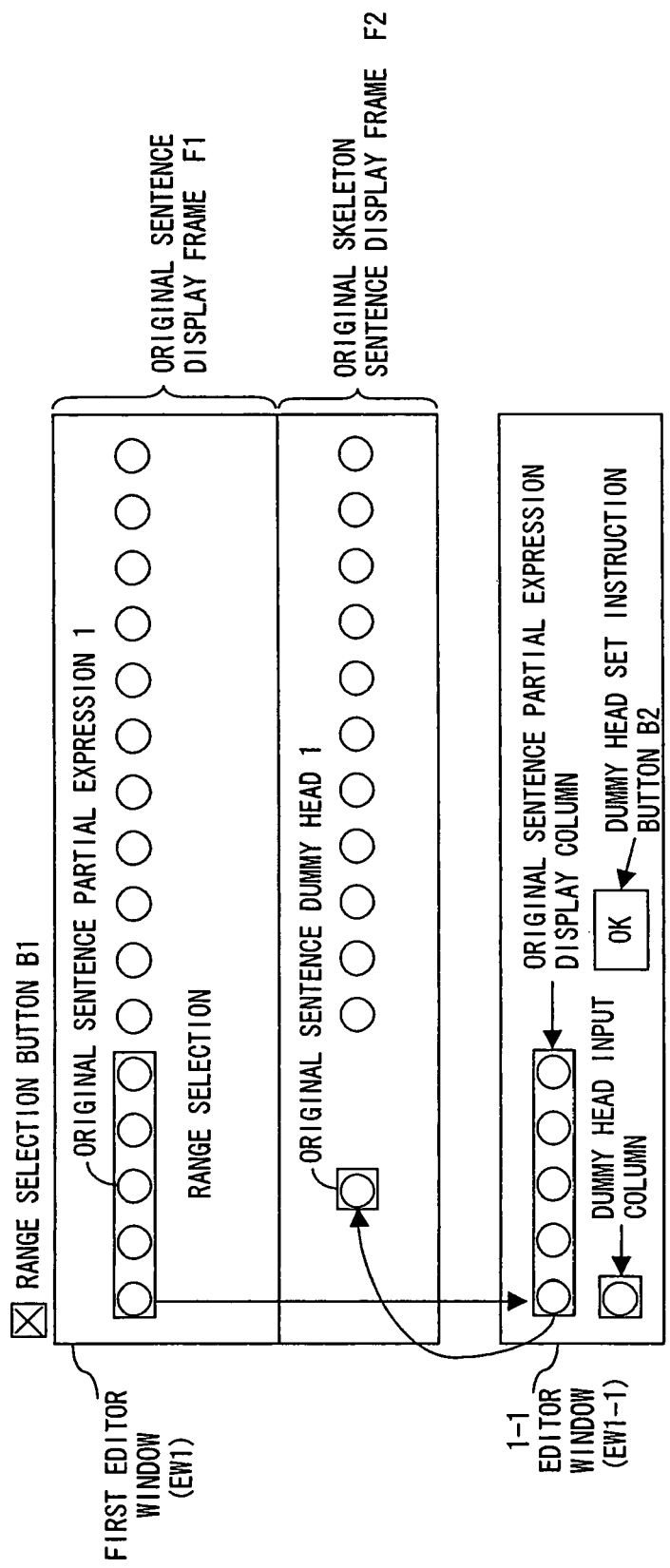
FIG. 6 shows an example (1) of the screen used when a partial expression and a dummy head are set.

The procedure of the setting process of the original sentence partial expression and the original sentence dummy head performed in steps S2 through S6 is practically explained by referring to FIG. 6. FIG. 6 shows one of the screen examples used when a partial expression and a dummy head are set. As shown in FIG. 6, a range selection button B1, a first editor window EW1, and a 1-1 editor window EW1-1 are displayed on the screen. The 1-1 editor window EW1-1 is a sub-window of the first editor window EW1. In the following explanation, the name of the sub-window of the first editor window EW1 which is the main window is indicated to a 1-i editor window EW1-i (i is a natural number) to clarify the main-sub relationship between windows.

The range selection button B1 is a button for setting a character string in an original sentence as an original sentence partial expression. The range selection button B1 is constantly displayed on the screen as a rule. The first editor window EW1 is provided with an original sentence display frame F1 displaying an original sentence and an original skeleton sentence display frame F2 displaying an original skeleton sentence. The 1-1 editor window EW1-1 includes an original sentence partial expression display column for display of an original sentence partial expression, a dummy head input column for input of an original sentence dummy head corresponding to the original sentence partial expression, and a dummy head set command button for indication of a setting of an original sentence dummy head. Although omitted in FIG. 6, a translation execute instruction button for indication of the execution of translation is displayed on the screen. An original sentence having a relatively simple sentence structure can be directly translated without performing a process of setting a partial expression.

Before the range selection button B1 is pressed, the original sentence display frame F1 of the first editor window EW1 displays the original sentence received by the original sentence reception unit 11. The original skeleton sentence display frame F2 and the 1-1 editor window EW1-1 are not yet displayed on the screen. On the screen, a user presses the range selection button B1 after selecting a character string to be set as an original sentence partial expression from the original sentence displayed on the original sentence display frame F1.

Figure 10:
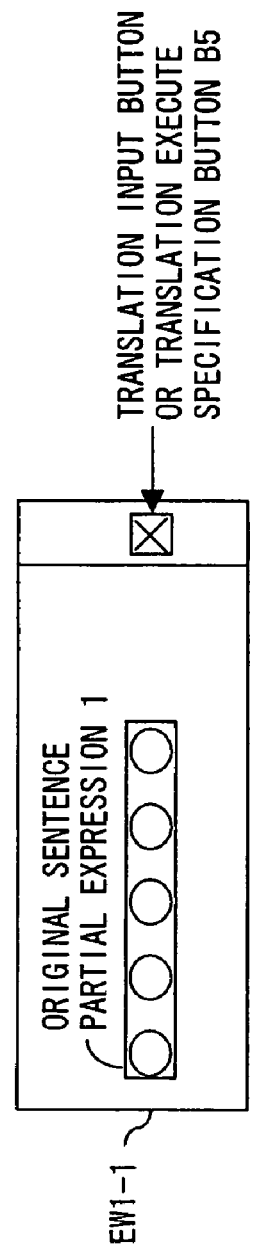
FIG. 10 shows an example (1) of displaying the 1-1 editor window after setting a dummy head.

When the range selection button B1 is pressed, the set instruction for the partial expression in the original sentence is output to the partial expression setting unit 12. Simultaneously, the original skeleton sentence display frame F2 is generated in the first editor window EW1, and the original sentence is displayed on the original skeleton sentence display frame F2. Furthermore, the 1-1 editor window EW1-1 is displayed on the screen, and the selected character strings are displayed in the original sentence partial expression display column and the dummy head input column in the 1-1 editor window EW1-1. The user generates an original sentence dummy head by editing the character string in the dummy head input column. When an original sentence dummy head is generated, the user pressed the dummy head set instruction button. Thus, the instruction to set an original sentence dummy head is issued to the dummy head setting unit 13. FIG. 10 shows an example of displaying the 1-1 editor window EW1-1 after the dummy head is set. The explanation of FIG. 10 is described later.

When a dummy head set instruction button is pressed, the original sentence partial expression displayed in the original skeleton sentence display frame F2 is replaced with the dummy head. To clearly distinguish the partial expression and the dummy head in the original sentence from the character string in other original sentences and to easily grasp the correspondence between the partial expression and the dummy head, the display format of the partial expression and the dummy head can be different from the display format of other character strings on the screen. For example, when a color display is used, and when the display color of the character strings contained in the original sentence other than the partial expression and the dummy head is, for example, black, the display color of the partial expression and the dummy head can be other than black, for example, red, etc. This display format is an example only. In addition to a change of a display color, there are various methods such as enclosing a partial expression and a dummy head by rectangles, inverting the display color for the partial expression and the dummy head, etc.

The explanation is given below by referring to an example of a sentence. When the original sentence 0 本発明により提供された統合型光送信装置は、光ビームを生成する光ヘッド・アセンブリ、及び光ビームを受光しそれに対し変調信号に応じ変調を与える光変調器によって特徴つけられる。(this sentence means: The integral optical transmission device provided by the present invention is characterized by an optical head assembly for generating an optical beam and an optical modulator for receiving an optical beam and modulating the beam according to a modulation signal)" is received, the original sentence 0 is displayed in the original sentence display frame F1 in the first editor window EW1.

When "本発明により提供された統合型光送信装置 (this means: the integral optical transmission device provided by the present invention)" in the original sentence 0 is set as the original sentence partial expression 1 and "本装置 (this means: this device)" is set as the original sentence dummy head 1 of the original sentence partial expression 1, the original sentence partial expression in the original sentence 0 is replaced with the original sentence dummy head 1, and subsequently the original skeleton sentence "本装置は、光ビームを生成する光ヘッド・アセンブリ、及び光ビームを受光しそれに対し変調信号に応じ変調を与える光変調器によって特徴付けられる。(this sentence means: This device is characterized by an optical head assembly for generating an optical beam and an optical modulator for receiving an optical beam and modulating the beam according to a modulation signal)" is displayed in the original skeleton sentence display frame F2. However, since the partial expression is being set, the skeleton sentence is not a finally obtained skeleton sentence.

The process from steps S2 through S7 is repeated until the translation support device 10 receives an instruction to terminate the setting of the original sentence partial expression from the user (No in step S8).

Figure 7:
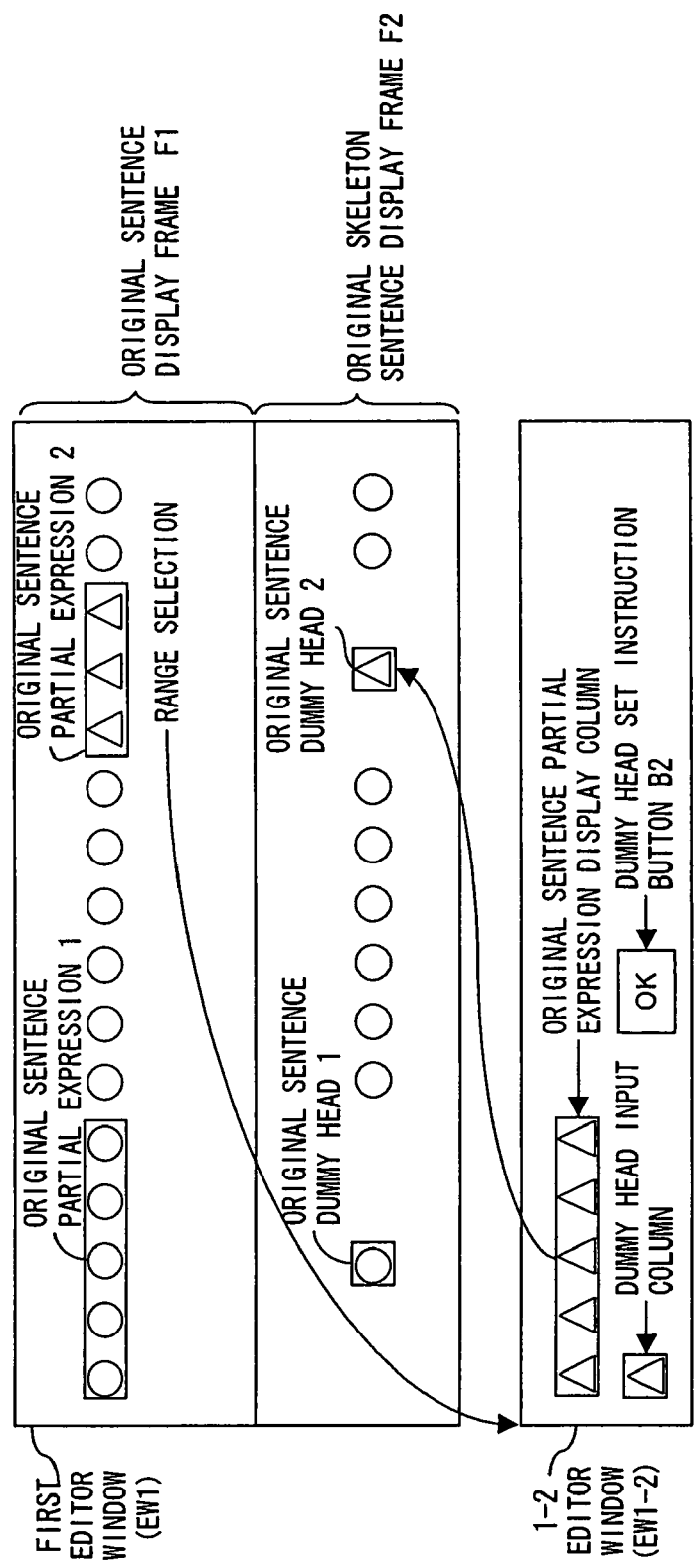
FIG. 7 shows an example (2) of the screen used when a partial expression and a dummy head are set.

The case in which the second original sentence partial expression is set is explained below by referring to FIG. 7. FIG. 7 shows an example of the screen used when a partial expression and a dummy head are set. Also in FIG. 7, as in FIG. 6, the range selection button B1 (omitted in FIG. 7), the first editor window EW1, and the 1-2 editor window EW1-2 are displayed on the screen. The previously generated 1-1 editor window EW1-1 is omitted in FIG. 7. When the operation space on the screen is insufficient, the user can reduce the editor window EW1-1 or represented as an icon.

When an original sentence partial expression setting process is terminated, the original skeleton sentence generated based on the partial expression setting process is displayed in the original skeleton sentence display frame F2. In this case, the 1-2 editor window EW1-2 is not displayed on the screen. On this screen, the user selects a character string to be set as a new original sentence partial expression from the original sentence displayed in the original sentence display frame F1, and then presses the range selection button B1.

When the range selection button B1 is pressed, the second partial expression set instruction is issued to the partial expression setting unit 12. As in setting the first partial expression, the 1-2 editor window EW1-2 is displayed on the screen. The user generates the second dummy head by editing the character string in the dummy head input column in the editor window EW1-2. When the dummy head is generated, the user presses the dummy head set instruction button. Thus, the dummy head set instruction button is issued to the dummy head setting unit 13.

When the dummy head set instruction button B2 is pressed, the second partial expression in the original sentence displayed in the original skeleton sentence display frame in the first editor window EW1 is replaced with the second dummy head. The third and subsequent partial expression setting processes are similarly performed. In the above-mentioned partial expression setting process, it is possible to set the character string in the set partial expression as a partial expression. The process of setting the character string in the partial expression as a partial expression can be performed when the partial expression is translated (described later).

To allow a user to easily grasp the correspondence between the partial expression and the dummy head, different display formats can be set between associated partial expression and dummy head and another partial expression and dummy head on the screen shown in FIG. 7. For example, relating to a display color, if a display color of a character string which is not a partial expression and a dummy head corresponding to the partial expression is black, and the display color of the first partial expression and the dummy head corresponding to the partial expression is red, then the display color of the second partial expression and the dummy head corresponding to the partial expression is any color other than black and red. For example, it can be blue. Likewise, the display colors of the third and subsequent partial expressions and dummy heads can be selected from among the colors not yet used for the character strings on the current screen. The display format is an example only.

The explanation is given below by referring to practical examples of sentences. When the setting process is completed on the first partial expression, the original sentence display frame F1 and the original skeleton sentence display frame F2 in the first editor window EW1 respectively display the original sentence 0"本発明により・・・光変調器によって特徴つけられる。(this means: The integral optical transmission device . . . and modulating the beam according to a modulation signal)" and the skeleton sentence "本装置は、光ビームを生成する光ヘッド・アセンブリ、及び光ビームを受光しそれに対し変調信号に応じ変調を与える光変調器によって特徴つけられる。(this sentence means: This device is characterized by an optical head assembly for generating an optical beam and an optical modulator for receiving an optical beam and modulating the beam according to a modulation signal)".

On the screen, if "光ビームを生成する光ヘッド・アセンブリ、及び光ビームを受光しそれに対し変調信号に応じ変調を与える光変調器 (this means: an optical head assembly for generating an optical beam and an optical modulator for receiving an optical beam and modulating the beam according to a modulation signal)" in the original sentence 0 is set as the original sentence partial expression 2 and "光変調器 (this means: an optical modulator)" is set as the dummy head 2 corresponding to the original sentence partial expression 2, then the original sentence partial expression 2 in the original sentence 0 that has been displayed in the original skeleton sentence display frame F2 is replaced with the dummy head 2. As a result, the original skeleton sentence "本装置は、光変調器によって特徴付けられる。(this means: This device is characterized by an optical modulator)" is displayed in the original skeleton sentence display frame F2.

Since the sentence structure of the original sentence partial expression 2 set in the explanation above is not simple, the character string in the original sentence partial expression 2 can be set as a partial expression 1 or a subsequent partial expression. The explanation about this case is given later.

When an instruction to end the setting of the partial expression is received from a user (YES in step S8), the process of setting a partial expression is terminated. The translation unit 17 obtains the skeleton sentence displayed in the original skeleton sentence display frame in the first editor window EW1 as the final skeleton sentence, and writes it to the area storing the skeleton sentence in the skeleton sentence table 23 (step S9).

Then, the translating process is started. The translating process is performed on each of the skeleton sentence and partial expression. First, the partial expression of the skeleton sentence is described by referring to the display example shown in FIGS. 8 and 9. FIG. 8 shows a display example of the first editor window EW1 after setting the partial expression. As shown in FIG. 8, the original sentence display frame F1, the original skeleton sentence display frame F2, and the translation execute instruction button B3 are displayed in the first editor window EW1. In FIG. 8, the arrow of the dotted line indicates the partial expression and the corresponding dummy head. As described above, for easy recognition, a set of corresponding partial expression and dummy head is displayed in the display format different from that of another set of the display format used to display a character string other than the partial expression of the dummy head. Therefore, a user can easily grasp the correspondence between the partial expression and the dummy head in the editor window.

When the translation execute instruction button B3 is pressed, the translation unit 17 generates a translation of an original skeleton sentence, that is, a translated skeleton sentence, by translating the original skeleton sentence. Since the original sentence is degenerated and simplified in the process from step S2 to S8 described above, the translation can be performed with higher accuracy than the translation performed directly from the original sentence by machine translation.

Figure 9:
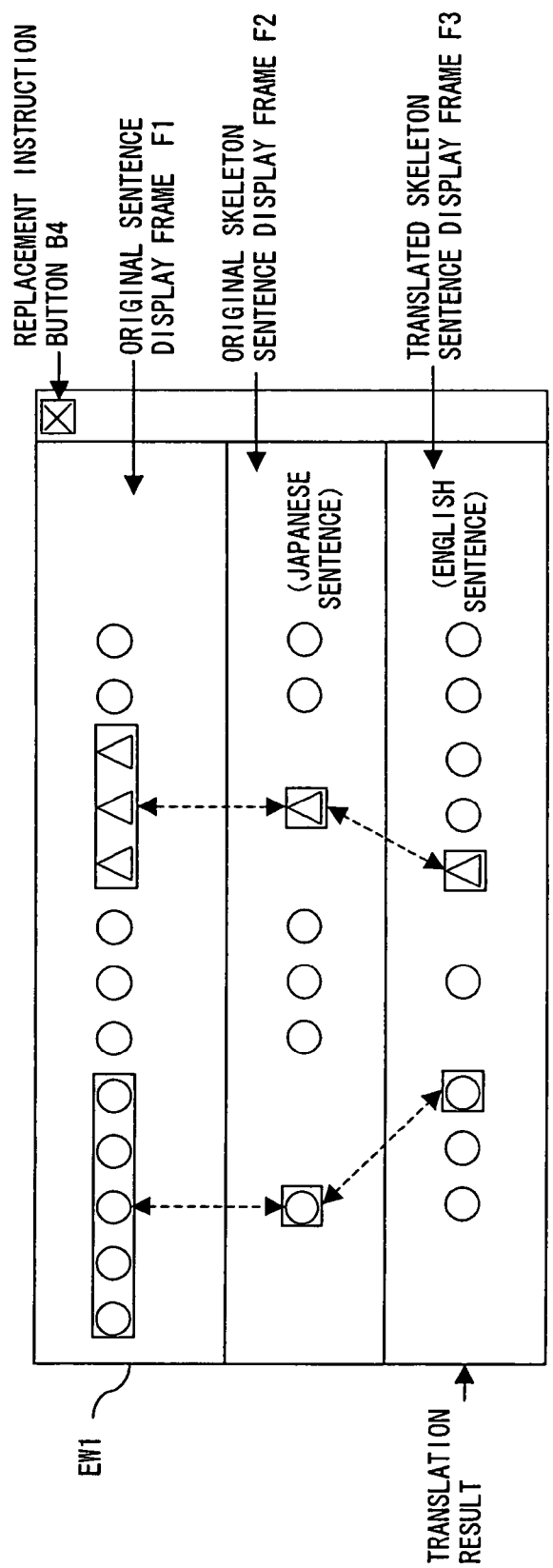
FIG. 9 shows an example of displaying the first editor window after the completion of translating a skeleton sentence.

FIG. 9 shows a display example of the first editor window EW1 after the translation of the original skeleton sentence. As shown in FIG. 9, when the original skeleton sentence is translated, the translated skeleton sentence display frame F3 displaying the translated skeleton sentence is displayed in the first editor window EW1. Also in FIG. 9, the arrow indicated by dotted lines shows corresponding partial expression and dummy head. For a user easy grasping the translated sentence dummy head corresponding to the original sentence dummy head, the translated sentence dummy head can be displayed in the same display format as the original sentence dummy head.

Since the original skeleton sentence contains the original sentence dummy head, the translation, that is, the translated skeleton sentence contains a translation of the original sentence dummy head, that is, a translated sentence dummy head. When the translated skeleton sentence is obtained, the translation unit 17 writes the translated skeleton sentence to a predetermined area in the skeleton sentence table 23. Furthermore, the translation unit 17 obtains the translated sentence dummy head from the translated skeleton sentence, and writes the translated sentence dummy head to a predetermined area of the expression table 22. The ID assignment unit 14 generates an ID to be assigned to each of the obtained translated sentence dummy heads and writes the generated ID to the area for storing the ID in the expression table 22. For example, when the expression table 22 shown in FIG. 5 is used, the ID assigned to the translated sentence dummy head is "YDH-(count value)". Since the count value is contained in the ID of the original sentence dummy head, the ID assignment unit 14 can obtain a count value from the ID of the original sentence dummy head corresponding to the translated sentence dummy head.

The display format of the partial expression and dummy head corresponding to each other is explained below by referring to a practical example. For example, assume that the original skeleton sentence 0 "本装置は、光変調器によって特徴付けられる。(this sentence means: This device is characterized by an optical modulator)" is displayed in the original skeleton sentence display frame F2.

In the original skeleton sentence 0, the original sentence dummy head 1 "本装置 (this means: this device)" and the original sentence dummy head "光変調器 (this means: an optical modulator)" are contained. They are displayed in the different display formats. Hereinafter, it is assumed that the dummy head 1 "本装置 (this means: this device)" is displayed in red, and the dummy head 2 "光変調器 (this means: an optical modulator)" is displayed in blue.

When the original skeleton sentence 0 is translated, the corresponding translated skeleton sentence 0 "This device is characterized by an optical modulator." is displayed in the translated skeleton sentence display frame F3. The translated sentence dummy head 1 "this device" corresponding to the original sentence dummy head 1 "本装置 (this means: this device)" is displayed in the same red as the original sentence dummy head 1, and the translated sentence dummy head 1 "an optical modulator" corresponding to the original sentence dummy head 2 "光変調器 (this means: an optical modulator)" is displayed in the same blue as the original sentence dummy head 2.

The translating process of the partial expression is explained below by referring to FIGS. 10 and 11. FIG. 10 shows a display example of a first editor window EW1-1 after setting a dummy head. As shown in FIG. 10, after setting a dummy head, an original sentence partial expression corresponding to the dummy head and a translation input button B5 are displayed in the 1-1 editor window EW1-1. The original sentence partial expression displayed in the editor window EW1-1 and the dummy head corresponding to the original sentence partial expression in the original skeleton sentence displayed in the editor window EW1 are displayed in the same display format, for example, the same display color. Therefore, the user can easily grasp on the screen to which dummy head in the original skeleton sentence the original sentence partial expression in the editor window EW1-1 corresponds.

When the translation input button B5 is pressed, the 1-1 editor window EW changes as shown in FIG. 11. As shown in FIG. 11, an input column for input of a translation of an original sentence partial expression, that is, a translated partial expression, and a translation completion button B6 are displayed in the 1-1 editor window EW1-1. The user translates the original sentence partial expression, and inputs a translation result in the input column and pressed the translation completion button B6.

When the translation completion button B6 is pressed, the translation unit 17 obtains a translated partial expression from the 1-1 editor window EW1-1, and writes the translated partial expression to a predetermined area of the expression table 22. The ID assignment unit 14 generates an ID to be assigned to the translated partial expression, and writes the generated ID to the area for storing an ID in the expression table 22. For example, when the expression table 22 shown in FIG. 5 is used, the ID to be assigned to the translated partial expression is "YBH-(count value)". Since the count value is contained in the ID of the original sentence partial expression, the ID assignment unit 14 can obtain the count value from the ID of the original sentence partial expression corresponding to the translated partial expression. Then, the 1-1 editor window EW1-1 disappears from the screen. Thus, the translating process of the partial expression terminates.

In place of the translation input button B5, the translation execute instruction button B3 can be used. In this case, when the translation execute instruction button B3 is pressed, the translation unit 17 generates a translated partial expression by translating the original sentence partial expression. Since the partial expression is shorter than the original sentence, and has a simple sentence structure, it is possible to perform translation with relatively high accuracy by machine translation.

The process is described below by referring to a practical example. In the display example shown in FIG. 10, for example, assume that the original sentence partial expression 1 "本発明により提供された統合型光送信装置 (this means: the integral optical transmission device provided by the present invention)" is displayed in the 1-1 editor window EW1-1.

When the translation input button B5 or the translation execute instruction button B3 shown in FIG. 10 is pressed and a translation result of the original sentence partial expression is obtained, the translated partial expression 1 "An integrated optical transmitter provided in accordance with the present invention" is displayed in the 1-1 editor window EW1-1. When the translation completion button B6 is pressed, the translation unit 17 obtains the translated partial expression 1.

As described above, the translated skeleton sentence and the translated partial expression are obtained. Then, the translated sentence replacement unit 18 replaces the dummy head in the translated skeleton sentence with the translated partial expression (step S11). The replacing process is performed as described below. First, the translated sentence replacement unit 18 obtains a translated sentence dummy head corresponding to the obtained translated partial expression from the expression table 22. For example, the translated sentence replacement unit 18 obtains a translated sentence dummy head having the ID of the same count value as the ID of the obtained translated partial expression from the expression table 22. Then, the translated sentence replacement unit the same character string as the obtained translated sentence dummy head contained in the translated skeleton sentence displayed in the first editor window EW1 with the translated partial expression corresponding to the translated sentence dummy head.

When a plurality of translated sentence dummy head are contained in the translated skeleton sentence, the translating and replacing process of the original sentence partial expression is repeated until the process on all original sentence partial expressions are completed.

For example, in the case above, the original sentence partial expression 1 and the original sentence partial expression 2 are set on the original sentence 0. Therefore, the translating and replacing process of the original sentence partial expression is performed on each of the original sentence partial expression 1 and the original sentence partial expression 2.

It is possible that the sentence structure of the original sentence partial expression is relatively complicated. In this case, by performing the procedure similar to the process in step S2 through S8, a character string in the original sentence partial expression can be set as a partial expression equal to or larger than 1.

A more practical procedure is described below. As described above, the range selection button B1 is displayed on the screen. The user presses the range selection button B1 after selecting a character string to be set as a short partial expression from the partial expression displayed in the 1-i editor window EW1-i after setting a dummy head shown in FIG. 10. Thus, the screen changes as explained above by referring to FIG. 6. In response to the instruction on the screen, the user inputs and sets a dummy head.

The process is explained below by referring to a practical example. In the display example shown in FIG. 10, for example, assume that the original sentence partial expression 2"光ビームを生成する光ヘッド・アセンブリ、及び光ビームを受光しそれに対し変調信号に応じ変調を与える光変調器 (this means: an optical head assembly for generating an optical beam and an optical modulator for receiving an optical beam and modulating the beam according to a modulation signal)" is displayed in the 1-2 editor window EW1-2. The user first selects the character string "光ビームを生成する光ヘッド・アセンブリ (this means: an optical head assembly for generating an optical beam)" to be further set as an original sentence partial expression from the original sentence partial expression being displayed in the editor window EW1-2, and then pressed the range selection button B1.

When the range selection button B1 is pressed, the instruction to set a partial expression is output to the partial expression setting unit 12. The original skeleton sentence display frame F2 is generated in the original skeleton sentence display frame F2 in the 1-2 editor window EW1-2, and the original sentence partial expression 2 is displayed in the original skeleton sentence display frame F2. Furthermore, the 1-2-1 editor window EW1-2-1 is displayed on the screen (not shown in the attached drawings). The 1-2-1 editor window EW1-2-1 is similar to the 1-1 editor window EW1-1. The dummy head is set as in the case described above by referring to FIG. 6, and the partial expression 2-1 in the original sentence partial expression 2 is replaced with the dummy head 2-1 corresponding thereto. When a partial expression equal to or larger than 2 is to be set in the original sentence partial expression 2, the process of setting the partial expression and dummy head is repeated, thereby generating the original skeleton sentence 2 of the original sentence partial expression 2.

Thus, when the original sentence partial expression 2-i and the corresponding original sentence dummy head 2-i are set in the original sentence partial expression 2 of the original sentence 0, the translation of the entire original sentence can be obtained through the following recursive translating and replacing process.
1) The translated skeleton sentence 2 which is a translation of the original skeleton sentence 2 of the original sentence partial expression 2 is generated. To be strict, the original skeleton sentence 2 of the original sentence partial expression 2 is not "sentence", but a partial expression.
2) The translated sentence dummy head 2-i corresponding to the original sentence dummy head 2-i is obtained from the translated skeleton sentence 2.
3) By translating the original sentence partial expression 2-i, the translated partial expression 2-i is obtained.
4) All translated sentence dummy head 2-i in the translated skeleton sentence 2 is replaced with the translated partial expression 2-i, thereby obtaining the translated partial expression 2 which is a translation of the original sentence partial expression 2.
5) The translated sentence dummy head 20 corresponding to the translated partial expression 2 in the translated skeleton sentence 0 of the original sentence 0 is replaced with the translated partial expression 2. When a translated sentence dummy head corresponding to another original sentence partial expression is contained in the translated skeleton sentence 0, all of them is replaced with the corresponding translated partial expression 2.

When the translating and replacing process is completed on all original sentence partial expressions, a translation of the entire original sentence is obtained, thereby terminating the process.

As described above, according to the translation support device 10, an original sentence partial expression which is an element as a common semantic portion in the original sentence can be replaced with an original sentence dummy head which is a shorter expression, thereby degenerating the original sentence. For replacement, the ID assignment unit 14 associates the original sentence partial expression with the corresponding original sentence dummy head using an ID. Then, the degenerated original sentence is translated, and the translated and degenerated dummy head in the original sentence, that is, the translated sentence dummy head is obtained. Furthermore, by translating each original sentence partial expression, the translated partial expression corresponding to each expression is obtained. At this time, the ID assignment unit 14 associates the original sentence partial expression in the original sentence, the corresponding original sentence dummy head, the corresponding translated partial expression, and the corresponding translated sentence dummy head using IDs. Finally, based on the IDs, the translated sentence dummy head contained in the translation of the degenerated original sentence is replaced with the corresponding translated partial expression, thereby completing the translation of the entire original sentence. Therefore, the user can automatically complete the translation of the entire original sentence when the translation of each original sentence partial expression is completed.

Since the process of degenerating or replacing an original sentence is managed by the translation support device 10 using an ID, the user does not consider the history of replacing or translating when the translation of the entire original sentence is completed by joining each translated partial expression.

Described below is a variation of the translation support device. For example, the translation support device 10 can further comprise a translation-with-original database and a translation memory device in addition to the configuration shown in FIG. 2. The translation-with-original database and the translation memory device are disclosed by Japanese Patent Laid-open Publication No. 2002-278964.

According to the translation support device with the above-mentioned configuration, the translation unit 17 performs translation when the translation execute instruction button B3 is pressed. At this time, the translation memory device obtains the original skeleton sentence or the original sentence partial expression displayed in the editor window when the translation execute instruction button is pressed, and by searching the translation-with-original database using the obtained original skeleton sentence or original sentence partial expression as an input retrieval sentence, a translation-with-original having a portion matching a portion of the input retrieval sentence can be obtained. The translation-with-original obtained as a result of the machine translation by the translation unit 17 or from the translation-with-original database is displayed on the screen. Thus, the user appropriately performs an editing operation by referring to the result of the machine translation and a translation-with-original, thereby finally determining a translation.

The translation support device according to the variation can also comprise a translation-with-original generation unit. The translation-with-original generation unit is also disclosed by Japanese Patent Laid-open Publication No. 2002-278964. The translation-with-original generation unit generates a translation-with-original using an input retrieval sentence and a translation result from the finally obtained input retrieval sentence, and writes the translation-with-original to the translation-with-original database. In this case, the translation-with-original is the information about the original sentence partial expression and the translated partial expression associated with each other. Thus, the translation-with-original generation unit accumulates the translation results of the original sentence partial expression in the translation-with-original database. The translation memory device obtains the translation-with-original containing a character string matching a character string in the input retrieval sentence from the updated translation-with-original database. The partial translation corresponding to the character string matching in the translation-with-original is used during translation by the translation unit 17. As described above, the input retrieval sentence is basically an original skeleton sentence or an original sentence partial expression, and can be the entire original sentence. Thus, the translation unit 17 and the translation memory device can cooperate with each other to improve the efficiency of the translating operation. The expression table 22 can be configured to also function as a translation-with-original database.

When the retrieval result of the translation-with-original database is displayed, the input/output control unit 19 can highlight and display a character string matching between the input retrieval sentence and retrieved translation-with-original.

Furthermore, the translation unit 17 can automatically insert into the translation of the input retrieval sentence the partial translation of character string matching the character string in the input retrieval sentence in the translation-with-original obtained as a result of the retrieval by the translation memory device when the input retrieval sentence is translated. Otherwise, when a plurality of translations-with-originals containing character strings matching the character string in the input retrieval sentence are obtained as a result of the retrieval, the translation unit 17 can insert into the translation the translation expression used in the translation-with-original selected by the user.

Otherwise, the translation-with-original generation unit can be designed to write a registration date and time when it writes a generated translation-with-original to the translation-with-original database. Then, as a detection result, when a plurality of translations-with-originals containing character strings matching the character string in the input retrieval sentence are obtained, the translation unit 17 can insert into the translation the translation expression used in the translation-with-original having the latest registration date and time.

When, as a detection result, a plurality of translations-with-originals containing character strings matching the character string in the input retrieval sentence are obtained, the translation unit 17 can judge whether or not there is an inclusion relation between the character strings contained in the translations-with-originals. If there is an inclusion relation, the translation expression used in the translation-with-original having the largest number of characters in the matching character string can be inserted into the translation. The input/output control unit 19 can be designed to highlight the portion corresponding to the character string contained in the longest character string.

In the translation support device, when an original sentence is displayed as compared with the finally obtained translation, the input/output control unit 19 can highlight the portion translated based on the translation-with-original in the original sentence and the translation. The highlight can be adopted when the original sentence partial expression is compared and displayed with the translated partial expression not when the original sentence is compared and displayed with the translation. As a highlighting method, for example, an underline, a change in display color, etc. can be used.

Figure 12:
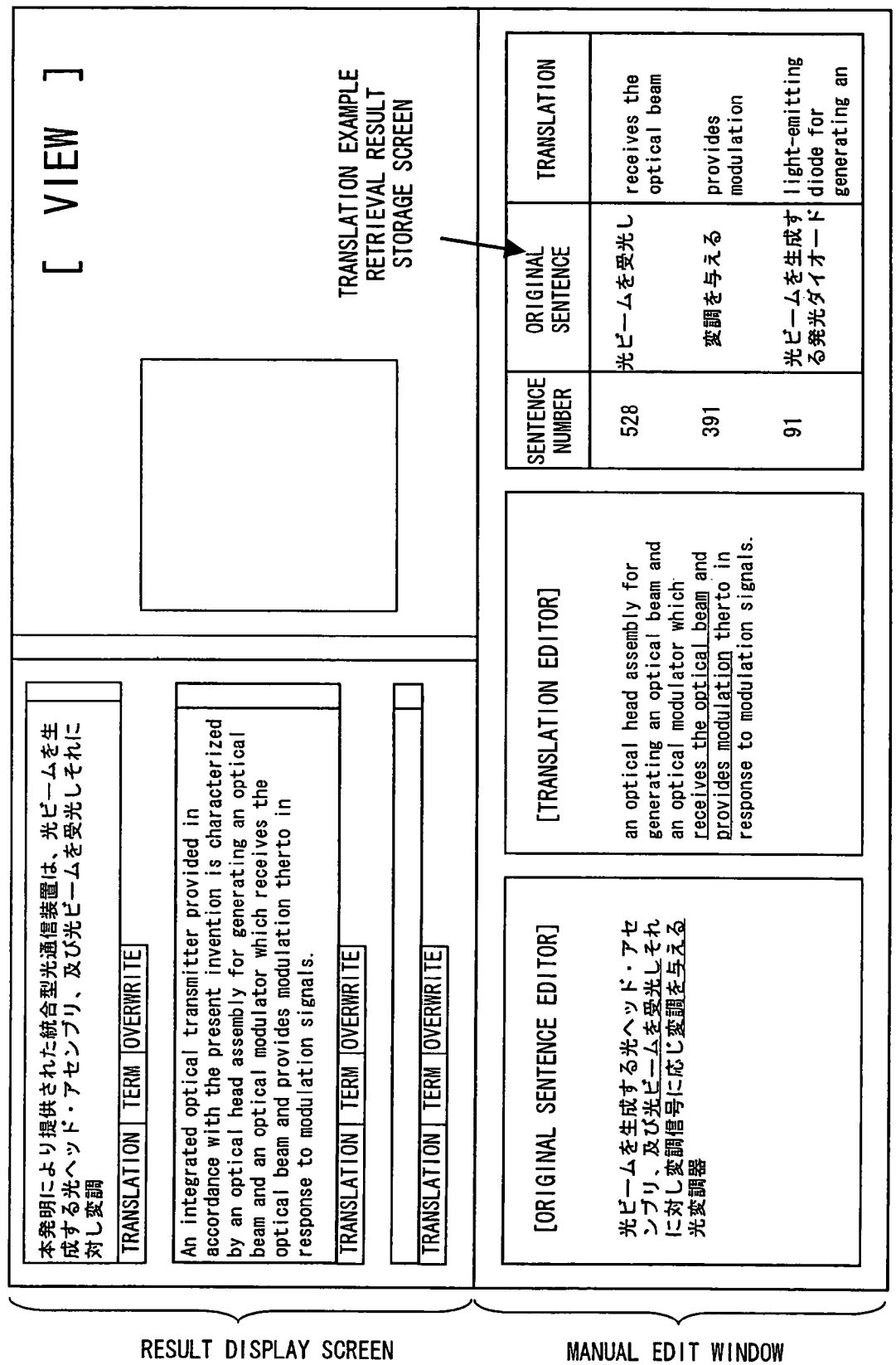
FIG. 12 shows an example of displaying a comparison between an original sentence and its translation.

FIG. 12 shows a display example when an original sentence is compared and displayed with its translation. In FIG. 12, a result display screen, a view display screen, a manual edit window, and a translation example detection result storage screen are displayed. On the result display screen, the finally obtained original sentence and translation are compared and displayed. In the manual edit window, an original sentence partial expression and its translated partial expression are compared and displayed. On the view display screen, the entire document containing an input original sentence is displayed. On the translation example detection result storage screen, a translation-with-original obtained from the translation-with-original database by the translation memory device using the original sentence partial expression as an input retrieval sentence can be constantly displayed.

In the manual edit window shown in FIG. 12, in the original sentence partial expression and its translated partial expression, the character string displayed as highlighted by applying an underline indicates a portion translated based on the translation-with-original obtained by the translation support device. The input/output control unit 19 can be further designed to embed in a highlighted character string a link to the position in the translation-with-original database storing the translation-with-original used when the character string is translated. Thus, the user can easily refer to the translation-with-original used when the translation is generated by trailing the link.

With the above-mentioned configuration, the input/output control unit 19 can be designed to highlight the portion translated by the translation unit 17 in the completed translation.

Furthermore, with the above-mentioned configuration, the input/output control unit 19 can be designed to display the portion translated by the translation unit 17, the portion translated based on the translation-with-original, and the portion edited by the user in the completed translation in such a way that the user can identify them in the different display methods.

The translation-with-original database for accumulating and storing the translation result of the original sentence partial expression can be shared among a plurality of translation support devices connected to a network. Thus, a user of a translation support device connected to the same network can use the result of the translating operation by a user of another translation support device. When a translation-with-original database is shared among a plurality of translation support devices, and when a translation-with-original is written to a translation-with-original database, the device identifier identifying the translation support device which issues a write instruction for the translation-with-original can be written with the translation-with-original. When the translation unit 17 obtains a plurality of translation-with-originals as a result of the retrieval by the translation memory device, the translation expression used in the translation-with-original having the identifier of the translation support device to which the translation unit 17 belongs can be used by priority in a translation.

In the translation support device, a user identifier for identification of a user of the device can replace a device identifier. In addition, when a user identifier for identification of a user is used in the translation support device, each user can be assigned a priority. The translation unit 17 prioritizes in a translation a translation expression used in a translation-with-original having a user identifier of a user assigned a higher priority.

The translation support device 10 and the translation support device according to a variation example of the device 2 can be configured using a computer. The configuration of the computer is explained below by referring to FIG. 13.

As shown in FIG. 13, the computer 30 comprises a CPU 31, memory 32, an input device 33, an output device 34, an external storage device 35, a medium drive device 36, and a network connection device 37, and these components are interconnected via a bus 38.

The memory 32 includes, for example, ROM (read only memory), RAM (random access memory), etc., and stores a program and data for use in processing. A record read from the original sentence storage unit 21, the expression table 22, the skeleton sentence table 23, the translated sentence storage unit 24, or a translation-with-original database is temporarily stored in the memory 32. The original sentence reception unit 11, the partial expression setting unit 12, the dummy head setting unit 13, the ID assignment unit 14, the counter 15, the original sentence replacement unit 16, the translation unit 17, and the translated sentence replacement unit 18 constituting the translation support device 10 are stored as a program in a specific program code segment of the memory 32 of the computer 30. Then a variation of the translation support device is used, a translation-with-original generation unit and a translation memory device are stored as a program in a specific program code segment of the memory 32 of the computer 30. A process performed by the translation support device 10 and its variation has been explained above by referring to the attached drawings.

The CPU 31 performs necessary processing by executing the above-mentioned program using the memory 32.

The input device 33 can be, for example, a keyboard, a pointing device, a touch panel, etc., and is used in inputting an instruction and information from a user. The output device 34 can be, for example, a display, a printer, etc., and is used in issuing an inquiry, process result, etc. to a user of the computer. The input device 33 and the output device 34 correspond to the input/output unit 20 shown in FIG. 2.

The external storage device 35 can be, for example, a magnetic disk device, an optical disk device, a magneto-optical disk device, etc. The external storage device 35 realizes the original sentence storage unit 21, the expression table 22, the skeleton sentence table 23, the translated sentence storage unit 24, and a translation-with-original database. The programs are stored in the external storage device 35 of the computer 30, and they can be loaded into the memory 32 for use as necessary.

The medium drive device 36 drives the portable record medium 39, and accesses the recorded contents. The portable record medium 39 can be any computer-readable record medium such as a memory card, a memory stick, a floppy disk, CD-ROM (compact disc read only memory), an optical disk, a magneto-optical disk, a DVD (digital versatile disk), etc. is used. The portable record medium 39 can store the programs to load them into the memory 32 of the computer 30 for use as necessary.

The network connection device 37 communicates with an external device through any network (circuit) such as a LAN, WAN, etc., and exchanges data through the communications. The programs are received from an external device, and can be loaded into the memory 32 of the computer 30 for use as necessary.

Figure 14:
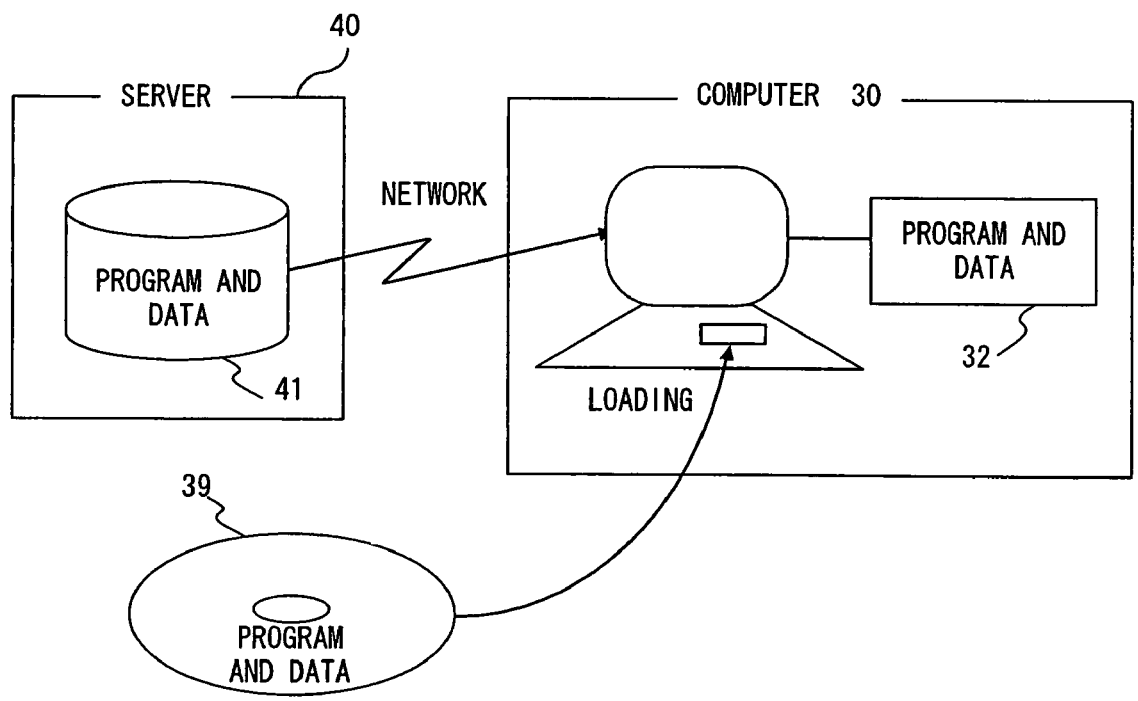
FIG. 14 is an explanatory view of loading a program and data to a computer.

FIG. 14 is an explanatory view of loading a program and data into the computer shown in FIG. 13.

To allow the computer to perform the function corresponding to the translation support device 10 and a variation explained by referring to the above-mentioned embodiments, the programs are stored in the computer-readable portable record medium 39 in advance. Then, as shown in FIG. 14, the computer is allowed to read the programs from the portable record medium 39, the external storage device 35 temporarily stores them in the memory 32 and the external storage device 35, and the stored program is read and executed by the CPU 31 of the computer.

The programs can be downloaded from the DB of the server 40 to the computer 30 through the network N. In this case, for example, the server 40 converts a program data representing a program to a program data signal, modulates the converted program data signal using a modem and obtains a transmission signal, and outputs the obtained transmission signal to the network N (transmission medium). The computer 30 which receives a program demodulates the received transmission signal using the modem, thereby obtaining a program data signal, and converts the obtained program data signal, thereby obtaining program data. When the communication circuit 31 (transmission medium) connecting the server 40 with the computer 30 is a digital circuit, a program data signal can be communicated.

The embodiment and a variation of the present invention are explained. However, the present invention is not limited to the embodiment and the variation, but other variations can be applied.

As described above, the translation support technology according to the present invention is applicable to an automatic translation device, an automatic translation service over a network, etc.

What is claimed is:

1. A translation support apparatus for supporting a process of translating an original sentence, comprising:
   a partial expression setting unit configured to set a first character string contained in the original sentence in a first language as a first original sentence partial expression;
   a dummy head setting unit configured to set, as a first original sentence dummy head in the first language, a second character string
     that is in the first language,
     that is shorter than the first original sentence partial expression, and
     that semantically or syntactically represents the first original sentence partial expression;
   an original sentence replacement unit configured to generate a first original skeleton sentence by replacing the first original sentence partial expression in the original sentence with the first original sentence dummy head;
   a translated sentence obtaining unit configured to obtain
     a first translated skeleton sentence which is a translation of the first original skeleton sentence translated from the first language into a second language and
     a first translated partial expression which is a translation of the first original sentence partial expression translated from the first language into the second language; and
   a translated sentence replacement unit configured to generate a translation in the second language of the original sentence by replacing a first translation dummy head which is a translation in the second language of the first original sentence dummy head and which is contained in the first translated skeleton sentence with the first translated partial expression.

2. The translation support apparatus according to claim 1, further comprising
   an output control unit configured to control an output device to enable the original sentence partial expression to be output to a first window different from a second window in which the original sentence is displayed.

3. The translation support apparatus according to claim 1, wherein
- the partial expression setting unit further sets a third character string contained in the first original sentence partial expression as a second original sentence partial expression;
- the dummy head setting unit further sets, as a second original sentence dummy head, a fourth character string
  - that is in the first language,
  - that is shorter than the second original sentence partial expression, and
  - that semantically or syntactically represents the second original sentence partial expression;
- the original sentence replacement unit further generates a second original skeleton sentence by replacing the second original sentence partial expression in the first original sentence partial expression with the second original sentence dummy head;
- the translated sentence obtaining unit further obtains
  - a second translated skeleton sentence which is a translation of the second original skeleton sentence translated from the first language into the second language, and
  - a second translated partial expression which is a translation of the second original sentence partial expression translated from the first language into the second language; and
- the translated sentence replacement unit generates the first translated partial expression by replacing a second translated sentence dummy head which is a translation in the second language of the second original sentence dummy head and which is contained in the second translated skeleton sentence with the second translated partial expression.

4. The translation support apparatus according to claim 1, further comprising
- an ID assignment unit configured to assign an identifier for identification to each of the first original sentence partial expression, the first original sentence dummy head, the first translated partial expression, and the first translated sentence dummy head, wherein
- the first original sentence partial expression, the first original sentence dummy head, the first translated partial expression, and the first translated sentence dummy head are associated with one another using the identifier; and
- the original sentence replacement unit and the translated sentence replacement unit perform the replacement based on the identifier.

5. The translation support apparatus according to claim 4, further comprising
- a counter unit configured to increment a count value each time an original sentence partial expression is specified, wherein
- the ID assignment unit generates the identifier based on the count value of the counter unit.

6. The translation support apparatus according to claim 5, wherein
- the translation-with-original storage unit is enabled to be shared by a plurality of translation support apparatuses connected over a network.

7. The translation support apparatus according to claim 1, further comprising:
- a translation-with-original generation unit configured to generate translation-with-original information by associating an original sentence partial expression with a translated partial expression of the original sentence partial expression;
- a translation-with-original storage unit configured to accumulate and store the translation-with-original information; and
- a retrieval unit configured to retrieve translation-with-original information including an original sentence partial expression matching at least a part of a third original sentence partial expression from the translation-with-original storage unit, wherein
- the retrieved translation-with-original information is used when a third translated partial expression corresponding to the third original sentence partial expression is obtained.

8. The translation support apparatus according to claim 7, further comprising
- an output control unit configured to control an output device to enable a translated character string to be output with highlight according to the translation-with-original information in the original sentence partial expression and the translated partial expression.

9. The translation support apparatus according to claim 8, further comprising
- a translation unit configured to perform machine translation, wherein
- the output control unit controls the output device to enable a character string translated by the translation unit to be output with highlight in the original sentence partial expression and the translated partial expression.

10. A computer-readable recording medium storing a computer program used to direct a computer to control and support a process of translating an original sentence, said process comprising:
- setting a first character string contained in the original sentence in a first language as a first original sentence partial expression;
- setting, as a first original sentence dummy head in the first language, a second character string
  - that is in the first language,
  - that is shorter than the first original sentence partial expression, and
  - that semantically or syntactically represents the first original sentence partial expression;
- generating a first original skeleton sentence by replacing the first original sentence partial expression in the original sentence with the first original sentence dummy head;
- obtaining a first translated skeleton sentence which is a translation of the first original skeleton sentence translated from the first language into a second language;
- obtaining a first translated partial expression which is a translation of the first original sentence partial expression translated from the first language into the second language; and
- generating a translation in the second language of the original sentence by replacing a first translation dummy head which is a translation in the second language of the first original sentence dummy head and which is contained in the first translated skeleton sentence with the first translated partial expression.

11. A translation supporting method for supporting a process of a computer translating an original sentence, the translation supporting method comprising:
- setting a first character string contained in the original sentence in a first language as a first original sentence partial expression;

setting, as a first original sentence dummy head in the first language, a second character string
  that is in the first language,
  that is shorter than the first original sentence partial expression, and
  that semantically or syntactically represents the first original sentence partial expression;
generating a first original skeleton sentence by replacing the first original sentence partial expression in the original sentence with the first original sentence dummy head;
obtaining a first translated skeleton sentence which is a translation of the first original skeleton sentence translated from the first language into a second language;
obtaining a first translated partial expression which is a translation of the first original sentence partial expression translated from the first language into the second language;
generating a translation in the second language of the original sentence by replacing a first translation dummy head which is a translation in the second language of the first original sentence dummy head and which is contained in the first translated skeleton sentence with the first translated partial expression;
outputting the generated translation in the second language of the original sentence to a translated sentence storage unit; and
controlling an output device to enable the original sentence partial expression to be output to a first window different from a second window in which the original sentence is displayed.

12. The translation supporting method according to claim 11, further comprising
setting a third character string contained in the first original sentence partial expression as a second original sentence partial expression;
setting, as a second original sentence dummy head, a fourth character string
  that is in the first language,
  that is shorter than the second original sentence partial expression, and
  that semantically or syntactically represents the second original sentence partial expression;
generating a second original skeleton sentence by replacing the second original sentence partial expression in the first original sentence partial expression with the second original sentence dummy head;
obtaining a second translated skeleton sentence which is a translation of the second original skeleton sentence, translated from the first language into the second language; and
obtaining a second translated partial expression which is a translation of the second original sentence partial expression translated from the first language into the second language, wherein
the first translated partial expression is generated by replacing a second translated sentence dummy head which is a translation in the second language of the second original sentence dummy head and which is contained in the second translated skeleton sentence with the second translated partial expression.

13. The translation supporting method according to claim 11, further comprising
assigning an identifier for identification to each of the first original sentence partial expression, the first original sentence dummy head, the first translated partial expression, and the first translated sentence dummy head; and
associating the first original sentence partial expression, the first original sentence dummy head, the first translated partial expression, and the first translated sentence dummy head with one another using the identifier, wherein
replacement of the first original sentence partial expression with the first original sentence dummy head and replacement of the first translation dummy head with the first translated partial expression are performed based on the identifier.

14. The translation supporting method according to claim 13, further comprising
incrementing a count value each time an original sentence partial expression is specified, wherein
the identifier is generated based on the count value.

15. The translation supporting method according to claim 11, further comprising
generating translation-with-original information by associating an original sentence partial expression with a translated partial expression of the original sentence partial expression;
accumulating and storing the translation-with-original information in a translation-with-original storage unit; and
retrieving translation-with-original information including an original sentence partial expression matching at least a part of a third original sentence partial expression from the translation-with-original storage unit, wherein
the retrieved translation-with-original information is used when a third translated partial expression corresponding to the third original sentence partial expression is obtained.

16. The translation supporting method according to claim 15, further comprising
controlling an output device to enable a translated character string to be output with highlight according to the translation-with-original information in the original sentence partial expression and the translated partial expression.

17. A translation support apparatus for supporting a process of translating an original sentence, comprising:
partial expression setting means for setting a first character string contained in the original sentence in a first language as a first original sentence partial expression;
dummy head setting means for setting, as a first original sentence dummy head in the first language, a second character string
  that is in the first language,
  that is shorter than the first original sentence partial expression, and
  that semantically or syntactically represents the first original sentence partial expression;
original sentence replacement means for generating a first original skeleton sentence by replacing the first original sentence partial expression in the original sentence with the first original sentence dummy head;
translated sentence obtaining means for obtaining
  a first translated skeleton sentence which is a translation of the first original skeleton sentence translated from the first language into a second language and a first translated partial expression which is a translation of the first original sentence partial expression translated from the first language into the second language; and translated sentence replacement means for generating a translation in the second language of the original sentence by replacing a first translation dummy head which is a translation in the second language of the first original sentence dummy head and which is contained in the first translated skeleton sentence with the first translated partial expression.

* * * * *

UNITED STATES PATENT AND TRADEMARK OFFICE
CERTIFICATE OF CORRECTION

PATENT NO. : 7,930,166 B2
APPLICATION NO. : 11/068955
DATED : April 19, 2011
INVENTOR(S) : Akira Ushioda et al.

It is certified that error appears in the above-identified patent and that said Letters Patent is hereby corrected as shown below:

Title Page Column 2, Line 7 Item (56) Other Pubs. delete "anaylysis" and insert -- Analysis --, therefor.

Title Page Column 2, Line 11 delete "Translasion" and insert -- Translation --, therefor.

Column 25, Line 55 in Claim 12 delete "sentence," and insert -- sentence --, therefor.

Signed and Sealed this
Nineteenth Day of July, 2011

David J. Kappos
*Director of the United States Patent and Trademark Office*